US006066181A

United States Patent [19]
DeMaster

[11] Patent Number: 6,066,181
[45] Date of Patent: May 23, 2000

[54] JAVA NATIVE INTERFACE CODE GENERATOR

[75] Inventor: Jerry D. DeMaster, Warren, R.I.

[73] Assignee: Analysis & Technology, Inc., North Stonington, Conn.

[21] Appl. No.: 08/986,114

[22] Filed: Dec. 8, 1997

[51] Int. Cl.[7] .................................................. G06F 9/45
[52] U.S. Cl. ............................................. 717/5; 709/302
[58] Field of Search .................................. 395/705, 702; 709/302

[56] References Cited

U.S. PATENT DOCUMENTS 5,974,256  10/1999  Matthews et al. ..................... 395/705

OTHER PUBLICATIONS

"Coroutine for Java," downloaded from www.nevaobject.com/java/jcoro/jcoromain.html on Oct. 17, 1997.
"Java Native Interface Specification," JavaSoft, Sun Microsystems, Inc., of Mountain View, CA (May, 1997).
OMG Interface Definition Language, see Corba v2.1 Specification, Ch. 3, OMG IDL Syntax and Semantics (Objects Management Group Aug., 1997), downloaded from www.omg.org.
"Twin Peaks White Paper: Bringing Together C++ and Java," downloaded from www.ilog.com/html/about_twinpeaks_white_paper.html (Mar. 26, 1996).
Ilog, "Twin Peaks White Paper: Bringing Together C+ + and Java," www.ilog.com/html/about_twinpeaks_white_paper.html, Mar. 1996.
Tommy Thorn, "Programming Languages for Mobile Code," ACM Computing Surveys, Sep. 1997.

*Primary Examiner*—Emauel Todd Voeltz
*Assistant Examiner*—Tuan Q. Dam

[57] ABSTRACT

A Java native interface code generator is disclosed to facilitate mixed language programming, by making native code programmed in a native language accessible to Java application programs. A programmer generates a native interface definition for native code, preferably using a neutral Interface Definition Language (IDL) to describe native code components (functions, data structures, constants and other user-defined data types), for which native mappings are to be generated. The Java native interface code generator supports complex data types, including nested data structures and multi-dimensional arrays. The Java native interface code generator reads and parses the user-derived native interface definition and generates Java Classes, data conversion code stubs and related header files. The Java Classes consist of classes of native methods, as well as classes for complex data types, which are called from Java. Each native method is mapped to a function or procedure written in the native code, using the Java Native Interface (JNI). The data conversion code stubs (JNI code) convert and map the native data and functions between the native language and Java. The Java class generated for complex data types, such as structures and unions, extends another Java class, JStruct or JUnion, respectively. The JStruct and JUnion classes implement Java Serializable and Cloneable interfaces and provides the core functionality for all data structures and unions, respectively, mapped to Java objects. Each Java data structure and union "extends" the JStruct or JUnion class and thereby inherits the behavior and characteristics of the JStruct or JUnion class, including memory management features. The JStruct and JUnion classes preferably provide methods for converting between members of a native language data structure or union, as appropriate, and fields of a Java object, as well as additional memory management functionality.

20 Claims, 33 Drawing Sheets

FIG. 4A

```
extern double j0(double);
extern double j1(double);
extern double jn(int, double);
extern double y0(double);
extern double y1(double);
extern double yn(int, double);
```

FIG. 4B

```
interface Bessel {
    double j0(in double x);
    double j1(in double x);
    double jn(in long n, in double x);
    double y0(in double x);
    double y1(in double x);
    double yn(in long n, in double x);
}; // interface
```

```
public class Bessel {
    public native double j0(double x);
    public native double j1(double x);
    public native double jn(int n, double x);
    public native double y0(double x);
    public native double y1(double x);
    public native double yn(int n, double x);
    // Load DLL for native code on first instance of this class.
    //
    static {
        System.loadLibrary("bessel");
    }
}
```

FIG. 4C

```
#include <stdlib.h>
#include <string.h>
#include <jni.h>
include <jglue.h>
#include "Bessel_impl.h"
#include "Bessel_stubs.h"
/*
** Class:    Bessel
** Method:   j0
** Signature: (D)D
*/
JNIEXPORT jdouble JNICALL Java_Bessel_j0(
    JNIEnv *env, jobject jthis, jdouble x)
{
    jdouble result;
    result = (jdouble)j0((double)x);
    return result;
}
```

FIG. 4D

```
public class Tutorial1 { public static void main(String argv[]) { double result;
    double x = 2.387;

Bessel b = new Bessel();

System.out.println("");
    System.out.println("Bessel functions for x = " + x + ":");
    System.out.println(" Kind\t\tOrder\tFunction\tResult\n");
    System.out.println(" First\t\t0\tj0(x)\t\t" + b.j0(x));
    System.out.println(" First\t\t1\tj1(x)\t\t" + b.j1(x));
    for (int c = 2; c < 5; ++c)
       System.out.println(" First\t\t" + c + "\tjn(n,x)\t\t" +
b.jn(c,x));

System.out.println(" Second\t\t0\ty0(x)\t\t" + b.y0(x));
    System.out.println(" Second\t\t1\ty1(x)\t\t" + b.y1(x));
    for (int c = 2; c < 5; ++c)
       System.out.println(" Second\t\t" + c + "\tyn(n,x)\t\t" +
b.yn(c,x));
  }
}
```

FIG. 4E

INTEGER TYPE MAPPING FILE

| IDL INTEGER TYPE | IDL MAPPING | MAPPED TYPE | MIN VALUE | MAX VALUE |
|---|---|---|---|---|
| short | JAVA | short | $-2^{15}$ | $2^{15} - 1$ |
| | JNI | jshort | | |
| | C | short | | |
| unsigned short | JAVA | short | $-2^{15}$ | $2^{15} - 1$ |
| | JNI | jshort | | |
| | C | unsigned short | 0 | $2^{16} - 1$ |
| long | JAVA | int | $-2^{31}$ | $2^{31} - 1$ |
| | JNI | jint | | |
| | C | long | | |
| unsigned long | JAVA | int | $-2^{31}$ | $2^{31} - 1$ |
| | JNI | jint | | |
| | C | unsigned long | 0 | $2^{32} - 1$ |
| long long | JAVA | long | $-2^{63}$ | $2^{63} - 1$ |
| | JNI | jlong | | |
| | C | long long | | |
| unsigned long long | JAVA | long | $-2^{63}$ | $2^{63} - 1$ |
| | JNI | jlong | | |
| | C | unsigned long long | 0 | $2^{64} - 1$ |

FIG. 5A

FLOATING POINT TYPE MAPPING FILE

| IDL FLOATING POINTTYPE | IDL MAPPING | MAPPED TYPE |
|---|---|---|
| float | JAVA | float |
| | JNI | jfloat |
| | C | float |
| double | JAVA | double |
| | JNI | jdouble |
| | C | double |
| long double | JAVA | |
| | JNI | |
| | C | |

FIG. 5B

OTHER TYPES MAPPING FILE

| IDL FLOATING POINTTYPE | IDL MAPPING | MAPPED TYPE | TRUE | FALSE |
|---|---|---|---|---|
| char | JAVA | byte | | |
| | JNI | jbyte | | |
| | C | char | | |
| wide char | JAVA | char | | |
| | JNI | jchar | | |
| | C | unsigned short | | |
| boolean | JAVA | boolean | true | false |
| | JNI | jboolean | JNI_TRUE | JNI_FALSE |
| | C | unsigned char | 1 | 0 |
| octet | JAVA | byte | | |
| | JNI | jbyte | | |
| | C | unsigned char | | |
| any | JAVA | | | |
| | JNI | | | |
| | C | | | |

FIG. 5C

TEMPLATE TYPE MAPPING FILE

| IDL TEMPLATE TYPE | IDL MAPPING | OPERATION MAPPING | STRUCT FIELD MAPPING |
|---|---|---|---|
| sequence | JAVA | op (T [ ] argname) | public T [ ] fieldname; |
| | JNI | op (..., jarray argname) | N/A |
| | C | op (T* argname, jsize n_argname) | T* argname; jsize n_argname |
| | | | |

FIG. 5D

TEMPLATE TYPE MAPPING FILE

| IDL TEMPLATE TYPE | IDL MAPPING | MAPPED TYPE |
|---|---|---|
| string | JAVA | java.lang.String |
| | JNI | jstring |
| | C | char * |

FIG. 5E

MULTI-DIMENSIONED ARRAY MAPPING FILE

| IDL TYPE | IDL MAPPING | MAPPED TYPE |
|---|---|---|
| arrays | JAVA | T [ ] [ ] ... |
| | JNI | jarray |
| | C | T [i1] [i2] ... |

FIG. 5F package ipd.util.jmudd;

import java.io.*;
import java.util.zip.*;

import ipd.util.Stringizer;

{
  // Life Cycle
  // public JStruct()
      {
        handle = 0;
      } public JStruct(int handle)
      {
        this.handle = handle;
        fromC();
      }

// Instance Methods

FIG. 6A

610 {
    public void toC()
    {
        if (handle == 0)
            handle = allocateC();

convertToC(handle);
    }

620 {
    public void toC(int c_handle)
    {
        if (c_handle != 0)    // throw exception if null???
            convertToC(c_handle);
    }

630 {
    public void fromC()
    {
        if (handle != 0)    // throw exception if null???
        {
            // Convert from C to Java
            convertFromC(handle);

// C memory no longer needed, free it.
            freeC(handle, true);
            handle = 0;
        }
    }

```
        public void fromC(int c_handle)
        {
            if (c_handle != 0)    // throw exception if null???
            {
                // Convert from C to Java
640             convertFromC(c_handle);

// C memory no longer needed, free it.
                freeC(c_handle, false);
                handle = 0;
            }
        } public final int getHandle(boolean convert)
        {
            if (handle == 0)
                handle = allocateC();

650         if (convert)                              FIG. 6B
                toC();

return handle;
        } protected void finalize()
660     {
            freeC(handle, true); // Free all C data structure memory
        }

// Native methods used to implement JStruct.
        //
        protected abstract native int allocateC();

670     protected abstract native void convertToC(int handle);

protected abstract native void convertFromC(int handle);

protected abstract native void freeC(int handle, boolean free_handle);
```

```
struct Simple      {
    short          small;
    long           big;
    long           several [3]
    string         message;
    string         messages[4];
};
```

FIG. 7A

```
#include <stdlib.h>
#include <string.h>
include <memory.h>
include <jni.h>
include <jglue.h>
#include "Simple_obj.h"
#include "Simple_stubs.h"
```

750 {
```
JNIEXPORT jint JNICALL Java_ Simple_allocateC(
    JNIEnv *env, jobject jthis)
{
    void *handle = calloc(1, sizeof(Simple));
    return (jint)handle;
```

FIG. 7D

```
import java.io.*;
import ipd.util.jmudd.*;

public final class Simple extends JStruct
    implements Serializable, Cloneable { public Simple() { several = new int[3];
    message = new java.lang.String();
    messages = new java.lang.String[4];
    for (int ii = 0; ii < 4; ++ii)
        messages[ii] = new java.lang.String();
}
```

705 {
```
public Simple(
    short            small,
    int              big,
    int              several[],
    java.lang.String message,
    java.lang.String messages[]) { this.small = small;
    this.big = big;
    this.several = several;
    this.message = message;
    this.messages = messages;
}
```

FIG. 7B

715 {
```
public Simple(int handle) {
    super(handle);
}
```

720 {
```
protected void finalize() {
    super.finalize();
}
```

725 {
```
public short            small;
public int              big;
public int              several[];
public java.lang.String message;
public java.lang.String messages[];
```

730 {
```
protected native int allocateC();

protected native void convertToC(int handle);

protected native void convertFromC(int handle);
```

735 { `protected native void freeC(int handle, boolean free_handle);`

```
public boolean equals(Object anObject) {
```

740
```
    if (anObject == null)
        return false;

if (!(anObject instanceof Simple))
        return false;

Simple another = (Simple)anObject;

if (this.small != another.small)
        return false;

if (this.big != another.big)
        return false;

for (int ii = 0; ii < several.length; ++ii)
    {
        if (this.several != another.several)
        {
            if (this.several == null || another.several == null)
                return false;     // one of the array objects is null if (this.several.length != another.several.length)
                return false;     // different array lengths if (this.several[ii] != another.several[ii])
                return false;     // different array elements
        }
        // else both arrays refer to the same array object (or null).
    }
    if (!this.message.equals(another.message))
        return false;

for (int ii = 0; ii < messages.length; ++ii)
    {
        if (this.messages != another.messages)
        {
            if (this.messages == null || another.messages == null)
                return false;     // one of the array objects is null if (this.messages.length != another.messages.length)
                return false;     // different array lengths if (!this.messages[ii].equals(another.messages[ii]))
                return false;     // different array elements
        }
    }
    return true;    // All fields are equal
}
```

745 {
```
static {
    System.loadLibrary("JMuddTest");
}
}
```

FIG. 7C

```
755  JNIEXPORT void JNICALL Java_Simple_convertToC(
        JNIEnv *env, jobject jthis, jint handle)
     {
       Simple *h = (Simple *)handle;
       if (JgGetShortFieldValue(env, jthis, "small", &h->small) == JNI_ERR)
          return;
       if (JgGetIntFieldValue(env, jthis, "big", &h->big) == JNI_ERR)
          return;
       {
          unsigned inner_dim = 3;
          long* pdata = (long*)&h->several;
          unsigned len;
          jarray aref;
          if (JgGetObjectFieldValue(env, jthis, "several", "[I", &aref) ==
    JNI_ERR)
             return;
          len = (*env)->GetArrayLength(env, aref);
          if (len != 3)
          {
             JgThrowException(env, "java/lang/IndexOutOfBoundsException",
    "Invalid array size.");
             return;
          }
          (*env)->GetIntArrayRegion(env, aref, 0, inner_dim, pdata);
          pdata += inner_dim;
       }
       if (JgGetStringFieldValue(env, jthis, "message", &h->message) == JNI_ERR)
          return;
       {
          unsigned inner_dim = 4;
          const char pdata = (const char)&h->messages;
          unsigned len;
          jarray aref;
          if (JgGetObjectFieldValue(env, jthis, "messages",
    "[Ljava/lang/String;", &aref) == JNI_ERR)
             return;
          len = (*env)->GetArrayLength(env, aref);
          if (len != 4)
          {
             JgThrowException(env, "java/lang/IndexOutOfBoundsException",
    "Invalid array size.");
             return;
          }
          {
             jboolean  copy;
             jstring   js;
             const char* cs;
             unsigned  n;
             for (n = 0; n < inner_dim; ++n, ++pdata)
             {
                if ((js = (*env)->GetObjectArrayElement(env, aref, n)) == NULL)
                   *pdata = NULL;
                else
                {
                   if ((cs=(*env)->GetStringUTFChars(env, js, ©)) == NULL)
                      return;
                   *pdata = strdup(cs);
                   (*env)->ReleaseStringUTFChars(env, js, cs);
                }
             }
          }
       }
     }
```

```
JNIEXPORT void JNICALL Java_Simple_convertFromC(
  JNIEnv *env, jobject jthis, jint handle)
{
  Simple *h = (Simple *)handle;
  if (JgSetShortFieldValue(env, jthis, "small", h->small) == JNI_ERR)
      return;
   if (JgSetIntFieldValue(env, jthis, "big", h->big) == JNI_ERR)
      return;
   {
     unsigned inner_dim = 3;
     long* pdata = (long*)&h->several;
     unsigned len;
     jarray aref;
     if (JgGetObjectFieldValue(env, jthis, "several", "[I", &aref) == JNI_ERR)
        return;
     len = (*env)->GetArrayLength(env, aref);
     if (len != 3)
     {
        JgThrowException(env, "java/lang/IndexOutOfBoundsException",
"Invalid array size.");
        return;
     }
     (*env)->SetIntArrayRegion(env, aref, 0, inner_dim, pdata);
     pdata += inner_dim;
   }
   if (JgSetStringFieldValue(env, jthis, "message", h->message) == JNI_ERR)
      return;
   {
     unsigned inner_dim = 4;
     const char pdata = (const char)&h->messages;
     unsigned len;
     jarray aref;
     if (JgGetObjectFieldValue(env, jthis, "messages",
"[Ljava/lang/String;", &aref) == JNI_ERR)
        return;
     len = (*env)->GetArrayLength(env, aref);
     if (len != 4)
     {
        JgThrowException(env, "java/lang/IndexOutOfBoundsException",
"Invalid array size.");
        return;
     }
     {
        jstring js;
        unsigned n;
        for (n = 0; n < inner_dim; ++n, ++pdata)
        {
          if (pdata == NULL || *pdata == NULL)
             js = (*env)->NewStringUTF(env, "");
          else if ((js = (*env)->NewStringUTF(env, *pdata)) == NULL)
             return;
          (*env)->SetObjectArrayElement(env, aref, n, js);
          free((void*)*pdata);
          *pdata = NULL;
        }
     }
   }
}
```

FIG. 7F

785 

```
JNIEXPORT void JNICALL Java_Simple_freeC(
   JNIEnv *env, jobject jthis, jint handle, jboolean free_handle)
{
   Simple *h = (Simple *)handle;

if ((void*)handle == NULL)
      return;

if (h->message)
   {
      free((void *)h->message);
      h->message = NULL;
   }

{
      unsigned inner_dim = 4;
      const char pdata = (const char)&h->messages;

{
         unsigned n;

for (n = 0; n < inner_dim; ++n, ++pdata)
         {
            free((void*)*pdata);
            *pdata = NULL;
         }
      }
   } if (free_handle)
   {
      free((void *)handle);
   }
}
```

FIG. 7G

```
package ipd.util.jmudd;

import java.io.*;
import java.util.zip.*;

import ipd.util.Stringizer;

{ protected static final int unspecified_discriminator = -999999999;
```

810
```
        public JUnion()
        {
            handle = 0;
            discriminator = unspecified_discriminator;
        }
```

820
```
        public JUnion(int handle)
        {
            this.handle = handle;
            discriminator = unspecified_discriminator;
        }
```

830
```
        protected void finalize()
        {
            freeC(handle, true);  // Free all C union type memory
        }
```

```
    protected int handle;

protected int discriminator;
```

FIG. 8A

840 {
```
public final int getHandle()
{
    if (handle == 0)
            handle = allocateC();

return handle;
}
```

860 {
```
public void toC()
{
    if (handle == 0)
       handle = allocateC();
    else
       freeC(handle, false);

convertToC(handle, discriminator);
}
```

870 {
```
public void toC(int c_handle)
{
    if (c_handle == 0)
        throw new NullPointerException("Null native memory handle.");

if (handle == 0)
        throw new NullPointerException("Union branch not set.");

copyC(c_handle, handle);
}
```

880 {
```
public void fromC()
{
    if (handle == 0)
        throw new NullPointerException("Native union branch not set.");

// Convert from C to Java
    convertFromC(handle, discriminator);

freeC(handle, true);
    handle = 0;
}
```

```
public void fromC(int c_handle)
{
    if (c_handle == 0)
        throw new NullPointerException("Null native memory handle.");

copyC(getHandle(), c_handle);
}
```

890 {
```
protected abstract native int allocateC();

protected abstract native void copyC(int dest, int src);

protected abstract native void convertToC(int handle, int discriminator);

protected abstract native void convertFromC(int handle, int discriminator);

protected abstract native void freeC(int handle, boolean free_handle);
```

FIG. 8C

OPERATION ARGUMENT/RESULT MAPPING FILE

| IDL TYPE | IDL MAPPING | IN | INOUT | OUT | RETURN |
|---|---|---|---|---|---|
| void | JAVA | N/A | N/A | N/A | void |
| | JNI | N/A | N/A | N/A | void |
| | C | N/A | N/A | N/A | void |
| boolean | JAVA | boolean | Boolean | Boolean | boolean |
| | JNI | jboolean | jobject | jobject | jboolean |
| | C | unsigned char | unsigned char* | unsigned char* | unsigned char |
| octet | JAVA | byte | Byte | Byte | byte |
| | JNI | jbyte | jobject | jobject | jbyte |
| | C | unsigned char | unsigned char* | unsigned char* | unsigned char |
| char | JAVA | byte | Byte | Byte | byte |
| | JNI | jbyte | jobject | jobject | jchar |
| | C | char | char* | char* | char |
| wchar | JAVA | char | Character | Character | char |
| | JNI | jchar | jobject | jobject | jchar |
| | C | unsigned short | unsigned short* | unsigned short* | unsigned short |
| short | JAVA | short | Short | Short | short |
| | JNI | jshort | jobject | jobject | jshort |
| | C | short | short* | short* | short |
| unsigned short | JAVA | short | Short | Short | short |
| | JNI | jshort | jobject | jobject | jshort |
| | C | unsigned short | unsigned short* | unsigned short* | unsigned short |

FIG. 9A

OPERATION ARGUMENT/RESULT
MAPPING FILE (cont'd)

| IDL TYPE | IDL MAPPING | IN | INOUT | OUT | RETURN |
|---|---|---|---|---|---|
| long | JAVA | int | Integer | Integer | int |
|  | JNI | jint | jobject | jobject | jint |
|  | C | int, long | int*, long* | int*, long* | int, long |
| unsigned long | JAVA | int | Integer | Integer | int |
|  | JNI | jint | jobject | jobject | jint |
|  | C | unsigned int/ unsigned long | unsigned int*/ unsigned long* | unsigned int*/ unsigned long* | unsigned int/ unsigned long |
| long long | JAVA | long | Long | Long | long |
|  | JNI | jlong | jobject | jobject | jlong |
|  | C | long long | long long* | long long* | long long |
| unsigned long long | JAVA | long | Long | Long | long |
|  | JNI | jlong | jobject | jobject | jlong |
|  | C | unsigned long long | unsigned long long* | unsigned long long* | unsigned long long |
| float | JAVA | float | Float | Float | float |
|  | JNI | jfloat | jobject | jobject | jfloat |
|  | C | float | float* | float* | float |
| double | JAVA | double | Double | Double | double |
|  | JNI | jdouble | jobject | jobject | jdouble |
|  | C | double | double* | double* | double |
| enum | JAVA | int | Integer | Integer | int |
|  | JNI | jint | jobject | jobject | jint |
|  | C | enum | enum* | enum* | enum |

FIG. 9B

OPERATION ARGUMENT/RESULT MAPPING FILE (cont'd)

| IDL TYPE | IDL MAPPING | IN | INOUT | OUT | RETURN |
|---|---|---|---|---|---|
| string | JAVA | String | StringRef | StringRef | String |
| | JNI | jstring | jobject | jobject | jstring |
| | C | char* | char** | char** | char* |
| wstring | JAVA | String | WideStringRef | WideStringRef | String |
| | JNI | jstring | jobject | jobject | jstring |
| | C | wchar* | wchar** | wchar** | wchar* |
| struct, fixed | JAVA | JStruct | JStruct | JStruct | JStruct |
| | JNI | jobject | jobject | jobject | jobject |
| | C | struct* | struct* | struct* | struct |
| struct, sequence | JAVA | JStruct [ ] | JStruct [ ] | JstructArray Ref | JStruct [ ] |
| | JNI | jobjectArray | jobjectArray | jobject | jobjectArray |
| | C | struct* | struct** | struct** | struct* |
| union, fixed | JAVA | JUnion | JUnion | JUnion | JUnion |
| | JNI | jobject | jobject | jobject | jobject |
| | C | union* | union* | union* | union |
| union, sequence | JAVA | JUnion [ ] | JUnion [ ] | JunionArray Ref | JUnion [ ] |
| | JNI | jobjectArray | jobjectArray | jobject | jobjectArray |
| | C | union* | union** | union** | union* |
| array, fixed | JAVA | type [ ] | type [ ] | type [ ] | type [ ] |
| | JNI | jarray | jarray | jarray | jarray |
| | C | type [ ] | type [ ] | type [ ] | array_slice* |

FIG. 9C

OPERATION ARGUMENT/RESULT MAPPING FILE (cont'd)

| IDL TYPE | IDL MAPPING | IN | INOUT | OUT | RETURN |
|---|---|---|---|---|---|
| array, sequence | JAVA | type [ ] [ ] | type [ ] [ ] | ObjectRef | type [ ] [ ] |
| | JNI | jarray | jarray | jobject | jarray |
| | C | type (*) [ ] | type (*) [ ] | array_slice** | array_slice* |
| sequence | JAVA | type [ ] | type [ ] | TypeArrayRef | type [ ] |
| | JNI | jarray | jarray | jobject | jarray |
| | C | type* | type* | type** | type* |
| any | JAVA | | | | |
| | JNI | | | | |
| | C | void* | void** | void** | void* |

FIG. 9D

```
struct Simple    {
    short        small;
    long         big;
    long         several [3]
    string  message;
    string  messages[4];
};

struct Nested {
    double  before;
    Simple  simple;
    long    after;
};

struct ThreeDeep {
    long    type;
    float   value;
    string  title;
    Simple  simple_array[3];
    Nested  nested;
};

interface JMuddStructTest { typedef Simple SimpleArray[3];

Simple testSimpleStruct(in Simple s_in, inout Simple s_inout,
        out Simple s_out);

Nested testNestedStruct(in Nested n_in, inout Nested n_inout,
        out Nested n_out);

ThreeDeep testThreeDeepStruct(in ThreeDeep td_in,
        inout ThreeDeep td_inout, out ThreeDeep td_out);

}; // interface JMuddStructTest
```

FIG. 10A

```
public class JMuddStructTest { public native Simple testSimpleStruct(Simple s_in, Simple s_inout, Simple s_out);

public native Nested testNestedStruct(Nested n_in, Nested n_inout, Nested n_out);

public native ThreeDeep testThreeDeepStruct(ThreeDeep td_in, ThreeDeep td_inout, ThreeDeep td_out);

// Load DLL for native code on first instance of this class.
    //
    static {
       System.loadLibrary("JMuddTest");
    }
}
```

FIG. 10B

```c
#include <stdlib.h>
#include <string.h>
#include <jni.h>
include <jglue.h>
#include "JMuddStructTest_impl.h"
#include "JMuddStructTest_stubs.h"

JNIEXPORT jobject JNICALL Java_ JMuddStructTest_testSimpleStruct(
  JNIEnv *env, jobject jthis, jobject s_in, jobject s_inout, jobject s_out)
{
   jobject result;
   jvalue arg;
   Simple rs;
   jint s_in_h;
   jint s_inout_h;
   jint s_out_h;

if (JgConvertStructInArgToC(env, s_in, &s_in_h) == JNI_ERR)
      return (jobject)NULL;

if (JgConvertStructInArgToC(env, s_inout, &s_inout_h) == JNI_ERR)
      return (jobject)NULL;

if (JgConvertStructOutArgToC(env, s_out, &s_out_h) == JNI_ERR)
      return (jobject)NULL;

if (!(result = JgNewObject(env, " Simple", NULL, NULL)))
      return (jobject)NULL;
   rs = testSimpleStruct((Simple *)s_in_h, (Simple *)s_inout_h, (Simple *)s_out_h);
   arg.i = (jint)&rs;
   if (JgCallVoidMethod(env, result, "fromC", "(I)V", &arg) == JNI_ERR)
      return (jobject)NULL;

if (JgConvertStructOutArgFromC(env, s_inout) == JNI_ERR)
      return (jobject)NULL;

if (JgConvertStructOutArgFromC(env, s_out) == JNI_ERR)
      return (jobject)NULL;

return result;
}
```

FIG. 10C

```
JNIEXPORT jobject JNICALL Java_ JMuddStructTest_testNestedStruct(
  JNIEnv *env, jobject jthis, jobject n_in, jobject n_inout, jobject n_out)
{
  jobject result;
  jvalue arg;
  Nested rs;
  jint n_in_h;
  jint n_inout_h;
  jint n_out_h;

if (JgConvertStructInArgToC(env, n_in, &n_in_h) == JNI_ERR)
     return (jobject)NULL;

if (JgConvertStructInArgToC(env, n_inout, &n_inout_h) == JNI_ERR)
     return (jobject)NULL;

if (JgConvertStructOutArgToC(env, n_out, &n_out_h) == JNI_ERR)
     return (jobject)NULL;

if (!(result = JgNewObject(env, " Nested", NULL, NULL)))
     return (jobject)NULL;
  rs = testNestedStruct((Nested *)n_in_h, (Nested *)n_inout_h, (Nested *)n_out_h);
  arg.i = (jint)&rs;
  if (JgCallVoidMethod(env, result, "fromC", "(I)V", &arg) == JNI_ERR)
     return (jobject)NULL;

if (JgConvertStructOutArgFromC(env, n_inout) == JNI_ERR)
     return (jobject)NULL;

if (JgConvertStructOutArgFromC(env, n_out) == JNI_ERR)
     return (jobject)NULL;

return result;
}
```

FIG. 10D

```
JNIEXPORT jobject JNICALL Java_ JMuddStructTest_testThreeDeepStruct(
  JNIEnv *env, jobject jthis, jobject td_in, jobject td_inout, jobject td_out)
{
  jobject result;
  jvalue arg;
  ThreeDeep rs;
  jint td_in_h;
  jint td_inout_h;
  jint td_out_h;

if (JgConvertStructInArgToC(env, td_in, &td_in_h) == JNI_ERR)
      return (jobject)NULL;

if (JgConvertStructInArgToC(env, td_inout, &td_inout_h) == JNI_ERR)
      return (jobject)NULL;

if (JgConvertStructOutArgToC(env, td_out, &td_out_h) == JNI_ERR)
      return (jobject)NULL;

if (!(result = JgNewObject(env, " ThreeDeep", NULL, NULL)))
      return (jobject)NULL;
  rs = testThreeDeepStruct((ThreeDeep *)td_in_h, (ThreeDeep *)td_inout_h,
(ThreeDeep *)td_out_h);
  arg.i = (jint)&rs;
  if (JgCallVoidMethod(env, result, "fromC", "(I)V", &arg) == JNI_ERR)
      return (jobject)NULL;

if (JgConvertStructOutArgFromC(env, td_inout) == JNI_ERR)
      return (jobject)NULL;

if (JgConvertStructOutArgFromC(env, td_out) == JNI_ERR)
      return (jobject)NULL;

return result;
}
```

FIG. 10E

```
import java.io.*;
import ipd.util.jmudd.*;

public final class Nested extends JStruct
  implements Serializable, Cloneable { public Nested() { simple = new Simple();
  } public Nested(
  double         before,
  Simple         simple,
  int            after) { this.before = before;
    this.simple = simple;
    this.after = after;
  } public Nested(int handle) {
    super(handle);
  } protected void finalize() {
    super.finalize();
  }

// Instance variables (structure members)
  //
  public double         before;
  public Simple         simple;
  public int            after;

// Instance methods
  // protected native int allocateC();

protected native void convertToC(int handle);

protected native void convertFromC(int handle);

protected native void freeC(int handle, boolean free_handle);
```

FIG. 11A

```
public boolean equals(Object anObject) { if (anObject == null)
        return false;

if (!(anObject instanceof Nested))
        return false;

Nested another = (Nested)anObject;

if (this.before != another.before)
        return false;

if (!this.simple.equals(another.simple))
        return false;

if (this.after != another.after)
        return false;

return true;   // All fields are equal
}
    static {
       System.loadLibrary("JMuddTest");
    }
}
```

FIG. 11B

```
#include <stdlib.h>
#include <string.h>
include <memory.h> include <jni.h>
include <jglue.h> include "Nested_obj.h"
include "Nested_stubs.h"

JNIEXPORT jint JNICALL Java_Nested_allocateC(
   JNIEnv *env, jobject jthis)
{
   void *handle = calloc(1, sizeof(Nested));

return (jint)handle;
}

JNIEXPORT void JNICALL Java_Nested_convertToC(
   JNIEnv *env, jobject jthis, jint handle)
{
   Nested *h = (Nested *)handle;

if (JgGetDoubleFieldValue(env, jthis, "before", &h->before) == JNI_ERR)
      return;

{
      jint e, offset = (jint)&h->simple;

e = JgConvertStructFieldFromJavaToC(env, jthis,
         "simple", "LSimple;", offset);
      if (e == JNI_ERR)
         return;
   } if (JgGetIntFieldValue(env, jthis, "after", &h->after) == JNI_ERR)
      return;
}
```

FIG. 11C

```
JNIEXPORT void JNICALL Java_Nested_convertFromC(
    JNIEnv *env, jobject jthis, jint handle)
{
    Nested *h = (Nested *)handle;

if (JgSetDoubleFieldValue(env, jthis, "before", h->before) == JNI_ERR)
        return;

{
        jint e, offset = (jint)&h->simple;

e = JgConvertStructFieldFromCToJava(env, jthis,
            "simple", "LSimple;", offset);
        if (e == JNI_ERR)
            return;
    } if (JgSetIntFieldValue(env, jthis, "after", h->after) == JNI_ERR)
        return;
}

JNIEXPORT void JNICALL Java_Nested_freeC(
    JNIEnv *env, jobject jthis, jint handle, jboolean free_handle)
{
    Nested *h = (Nested *)handle;

if ((void*)handle == NULL)
        return;

{
        jint e, offset = (jint)&h->simple;

e = JgFreeStructField(env, jthis,
            "simple", "LSimple;", offset);
        if (e == JNI_ERR)
            return;
    } if (free_handle)
    {
        free((void *)handle);
    }
}
```

FIG. 11D

JAVA NATIVE INTERFACE CODE GENERATOR

FIELD OF THE INVENTION

The present invention relates to a method and apparatus for mixed language programming, and more particularly, to a method and apparatus for making routines and complex data types written in a native language, such as C, C++ or Assembly, accessible to Java applications.

BACKGROUND OF THE INVENTION

Today's world of computer programming offers many high-level programming languages. Java™, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks which must be performed by an application programmer, including memory management and cross-platform porting. In this manner, the Java programmer can better focus on design and functionality issues.

Although it is desirable to take advantage of Java's software portability, so that software applications may easily be moved to another environment, there are a number of reasons why a programmer may desire to access platform dependent native code. While most applications can be written entirely in Java, there are situations where Java alone does not meet the needs of an application. For example, it may be desirable to implement time-critical or computationally intensive tasks in another programming language, such as C, C++, FORTRAN or Assembly. In addition, a company's institutional investment in existing native software routines may make it too expensive to reimplement the native routines in Java.

Programmers currently use the Java Native Interface (JNI) to write Java native methods (classes) to handle those situations where an application cannot be written entirely in Java. The JNI is a programming interface implemented as part of the Java Developer's Kit (JDK) that allows Java code to interoperate with applications and libraries written in other languages, such as C, C++, FORTRAN and Assembly. Even with the Java Native Interface, however, significant man-hours of programming effort are required to implement native methods and to access native data structures from Java. Furthermore, programming with the Java Native Interface is not for the inexperienced programmer. Thus, experienced programming talent must undertake the tedious task of JNI programming, thereby substantially increasing development costs.

Currently, the implementation of native methods and data structures in Java using the Java Native Interface is a labor-intensive manual process. As with any manual programming task, it is quite likely that each programmer would implement the same native method differently, in accordance with personal preferences and programming styles. Inconsistent implementations, however, dramatically increase the ongoing costs of software maintenance and software extension. In addition, unless the native method is implemented by an experienced programmer, the implementation is likely to be error-prone.

As apparent from the above-described deficiencies with conventional techniques for making native code accessible to Java applications, a need exists for an automated technique for making native code accessible to Java applications that provides consistent, reliable and maintainable Java Native Interface code. A further need exists for an improved technique for converting complex data types.

SUMMARY OF THE INVENTION

A Java native interface code generator is disclosed to facilitate mixed language programming. The Java native interface code generator makes native code programmed in a native language, such as C, C++ or Assembly, accessible to Java application programs. A programmer initially generates a native interface definition for native code, preferably using a neutral Interface Definition Language (IDL) to describe native code components, namely, the functions, data structures, constants and other user-defined data types, for which native mappings are to be generated. The Java native interface code generator also supports complex data types, including nested data structures and multi-dimensional arrays. The Interface Definition Language (IDL) may be embodied, for example, as the OMG Interface Definition Language Compiler Front End (CFE) Version 1.3, developed by Sun Microsystems, Inc. of Mountain View, Calif.

The Java native interface code generator reads and parses the user-derived native interface definition and generates the appropriate Java and native language code required to implement the native capability in Java. Specifically, the Java native interface code generator generates Java Classes, data conversion code stubs and related header files. Consistent, reliable and maintainable Java Classes and data conversion code stubs are produced by the Java native interface code generator, since the Java Classes and data conversion code stubs are produced from the native interface definitions written in a consistent IDL.

The Java Classes consist of classes of native methods, as well as classes for complex data types, which are called from Java. The Java Classes load the native code DLL at run-time. Each native method is mapped to a function or procedure written in the native code, using the Java Native Interface (JNI). Thus, each Java Class is the programmer's API to the native methods that make up the native method implementation. The data conversion code stubs (JNI code) convert and map the native data and functions between the native language and Java.

According to another aspect of the invention, the Java class generated for complex data types, such as structures and unions, extends another Java class, JStruct and JUnion, respectively. Thus, the Java native interface code generator provides JStruct and JUnion classes, which are an abstract superclass for Java complex data types. The JStruct and JUnion classes implement Java Serializable and Cloneable interfaces and provide the core functionality for all data structures and unions, respectively, mapped to Java objects. The JStruct and JUnion classes specify characteristics that apply to all Java data structures and unions. Each Java data structure "extends" the JStruct class and thereby inherits the behavior and characteristics of the JStruct class, including memory management features. Likewise, each Java union is said to "extend" the JUnion class and thereby inherits the behavior and characteristics of the JUnion class, including memory management features. In this manner, each Java data structure and union is sure to have proper memory management, including allocation, freeing and garbage collection.

In accordance with the present invention, the JStruct and JUnion classes preferably provide methods for converting between members of a native language data structure or union, as appropriate, and fields of a Java object, as well as additional memory management functionality. In this manner, a Java data structure that extends the JStruct class, or a Java union that extends the JUnion class, will inherit these methods. In addition, each of the Java data structures and unions (the subclasses of JStruct and JUnion) must provide native methods to convert to/from the members of a native language data structure or union, as appropriate, and fields of a Java object. In addition, each of the Java data structures and unions must provide native methods to allocate and free memory for the native language data structure or union, since the Java memory space is separate from the native language memory, and the Java garbage collector cannot monitor the native language memory.

A more complete understanding of the present invention, as well as further features and advantages of the present invention, will be obtained by reference to the following detailed description and drawings.

BRIEF DESCRIPTION OF THE DRAWINGS

FIG. 4A provides the function prototypes for the illustrative Bessel functions;

FIG. 4B illustrates the native interface definition for the Bessel functions (bessel.idl) of FIG. 4A;

FIG. 4C illustrates the Java class for the Bessel function (Bessel.java);

FIG. 4D illustrates the data conversion code stubs for the Bessel function (Bessel.java);

FIG. 4E illustrates a Java application that invokes the Bessel native method;

FIGS. 5A through 5F illustrates the mappings of various IDL data types to Java, the native language and the JNI code;

FIGS. 6A and 6B, collectively, illustrate portions of the JStruct class (JStruct.java) in accordance with one embodiment of the invention;

FIGS. 7A through 7G, collectively, provide an example of a Java data structure, Simple, that extends and modifies the JStruct class of FIGS. 6A and 6B;

FIGS. 8A through 8C, collectively, illustrate portions of the JUnion class (JUnion.java) in accordance with one embodiment of the invention;

FIGS. 9A through 9D, collectively, provide the mappings from IDL to Java, the native language and the JNI code, for each of the various IDL types as parameters;

FIG. 10A provides the native interface definition for the illustrative JmuddStructTest class and related complex data types;

FIG. 10B illustrates the Java class for the JmuddStructTest illustration;

FIGS. 10C through 10E, collectively, provide the data conversion code stubs for the JmuddStructTest class;

FIGS. 11A and 11B, collectively, provide the Java class for the Nested data structure shown in FIG. 10A; and FIGS. 11C and 11D, collectively, provide the data conversion code stubs for the Nested data structure shown in FIG. 10A.

DETAILED DESCRIPTION

Figure 1:
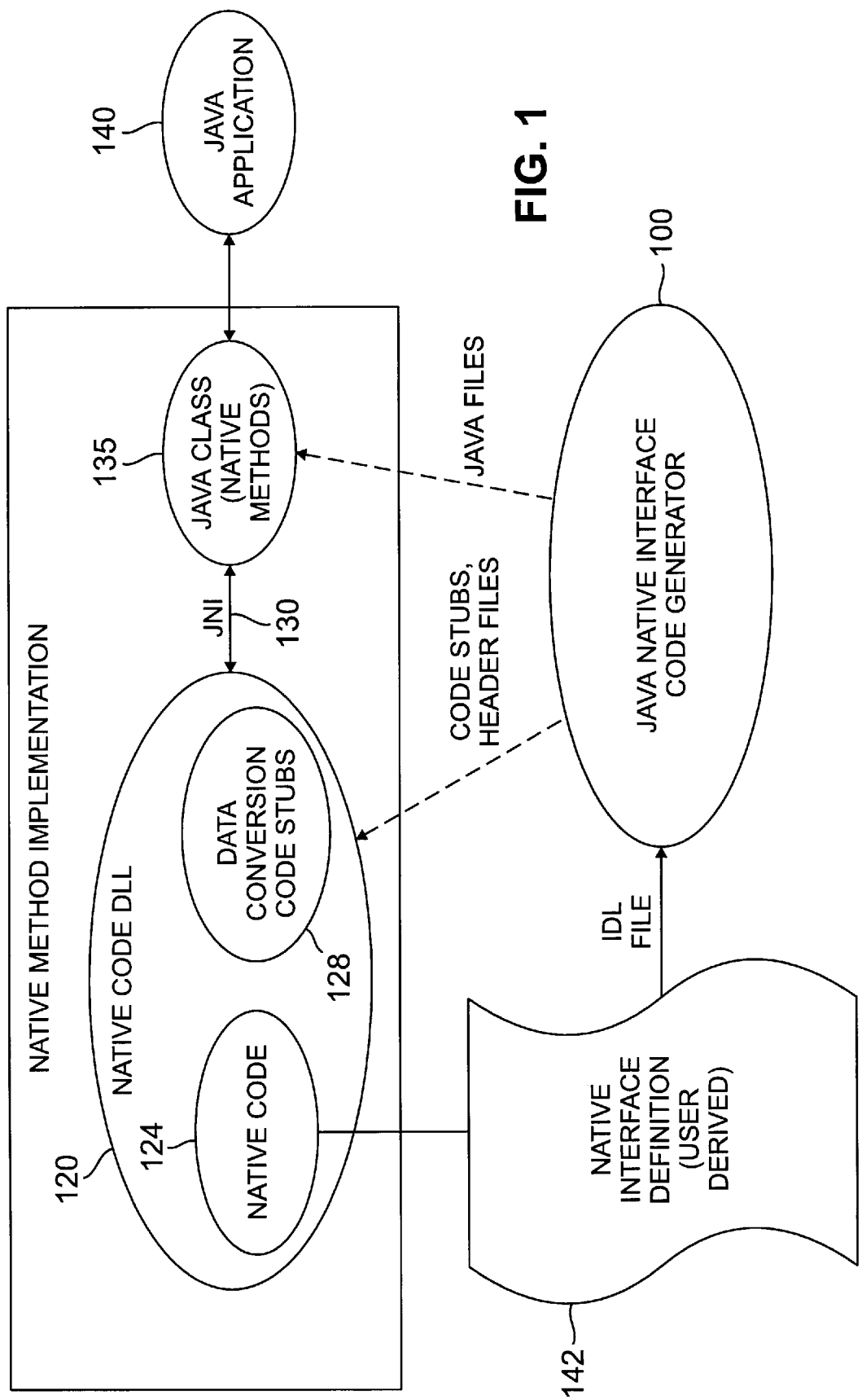
FIG. 1 illustrates a Java native interface code generator in accordance with the present invention that makes native code accessible to Java application programs.

FIG. 1 illustrates a Java native interface code generator 100 that facilitates mixed language programming by making native code 124, programmed in a native language, such as C, C++ or Assembly, accessible to Java application programs 140. Thus, the native code 124 is to be called from a Java application 140. As used herein, a native language is any programming language that uses a linking convention in a similar manner to the C programming language and compiles code into Dynamic Linked Libraries (DLLs) 120. A DLL 120 is a collection of functions and procedures that can be loaded, or linked to dynamically, at run-time by a process. The DLL can be shared across multiple processes in a known manner. The term "DLL" applies in the Windows NT environment, but also encompasses the terms "shared library" and "shared object," for HP-UX and Solaris platforms, respectively.

As discussed further below in conjunction with FIG. 3, if a programmer desires to access native code 124 from a Java application program 140, the programmer initially generates a native interface definition 142, that preferably uses a neutral Interface Definition Language (IDL) to describe native code components, namely the functions, data structures, constants and other user-defined data types, for which native mappings are to be generated. According to a feature of the present invention, discussed further below in a section entitled Constructed Data Types, the Java native interface code generator 100 also supports complex data types, including nested data structures and multi-dimensional arrays. The Interface Definition Language (IDL) may be embodied, for example, as the OMG Interface Definition Language Compiler Front End (CFE) Version 1.3, developed by Sun Microsystems, Inc. of Mountain View, Calif. For a more detailed discussion of the OMG Interface Definition Language, see Corba v2.1 Specification, Ch. 3, OMG IDL Syntax and Semantics (Object Management Group August, 1997), incorporated by reference herein. The IDL defines a component's boundaries, or the component's interfaces with potential clients. The selected IDL should be portable across languages, tools, operating systems, and networks. The IDL specifies a component's attributes, the parent classes it inherits from, the input and output parameters and their data types. In an alternate embodiment, the header files associated with the native methods and complex data types to be utilized can be parsed directly. The header files include the function prototypes and provide the required information for mapping between the native language and Java. This alternate implementation, however, requires a different parser for each native language.

The Java native interface code generator 100 reads and parses the user-derived native interface definition 142, in a known manner, and generates the appropriate Java and native language code required to implement the native capability in Java. Specifically, the Java native interface code generator 100 generates Java Classes 135 and data conversion code stubs 128 (and related header files). According to a feature of the present invention, the consistent, reliable and maintainable Java Classes 135 and data conversion code stubs 128 are produced by the Java native interface code generator 100, since they are produced from the native interface definitions 142 written in a consistent IDL.

The Java Classes 135 consist of classes of native methods, as well as classes for complex data types, which are called from Java. The Java Classes 135 are responsible for loading the native code DLL 120 at run-time. Each native method is mapped to a function or procedure written in the native code, using the Java Native Interface (JNI) 130. Thus, each Java Class 135 is the programmer's API to the native methods that make up the native method implementation. The JNI 130 is a programming interface implemented as part of the Java Developer's Kit (JDK) that allows Java code to interoperate with applications and libraries written in other languages, such as C, C++, FORTRAN and Assembly. The JDK is commercially available from JavaSoft, Sun Microsystems, Inc., of Mountain View, Calif. The data conversion code stubs 128 (JNI code) convert and maps the native data and functions between the native language and Java. The native code DLL 120 (created from the compilation of the native code 124 along with the data conversion code stubs 128 (JNI code) used for conversion between Java and the native language) is loaded by the Java virtual machine (VM) at run-time.

Figure 2:
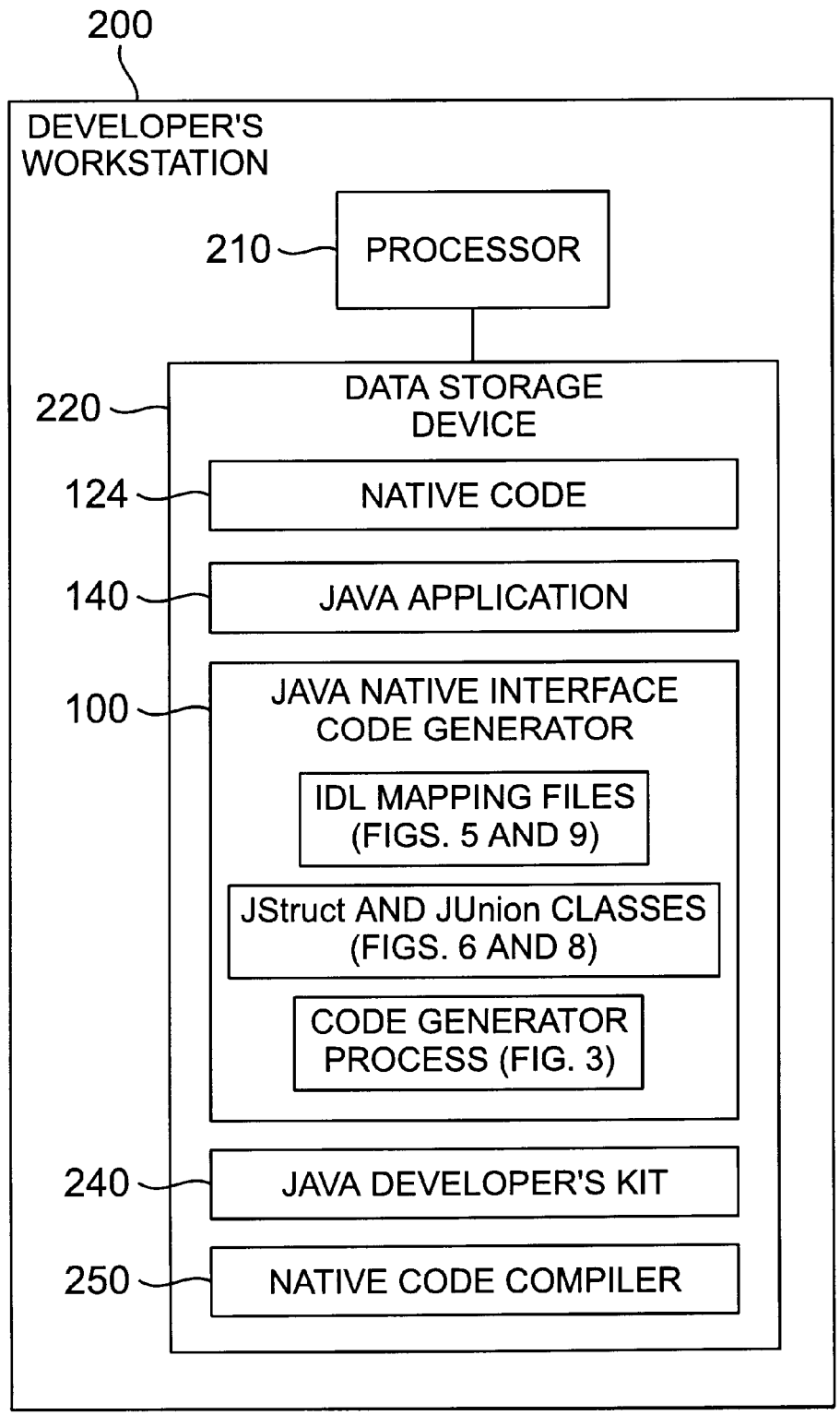
FIG. 2 is a schematic block diagram illustrating workstation that implements the Java native interface code generator of FIG. 1.

Thus, as shown in FIG. 2, in order to implement mixed language programming in accordance with the present invention, the workstation 200, or other computing device, utilized by the programmer or developer should contain a number of software components and tools. FIG. 2 is a block diagram showing the architecture of an illustrative developer workstation 200. The workstation 200 preferably includes a processor 210 and related memory, such as a data storage device 220, which may be distributed or local. The processor 210 may be embodied as a single processor, or a number of local or distributed processors operating in parallel. The data storage device 220 and/or a read only memory (ROM) are operable to store one or more instructions, which the processor 210 is operable to retrieve, interpret and execute. The processor 210 preferably includes a control unit, an arithmetic logic unit (ALU), and a local memory storage device, such as, for example, an instruction cache or a plurality of registers, in a known manner. The control unit is operable to retrieve instructions from the data storage device 220 or ROM. The ALU is operable to perform a plurality of operations needed to carry out instructions. The local memory storage device is operable to provide high-speed storage used for storing temporary results and control information.

The data storage device 220 preferably includes the native code 124 to be leveraged, as well as the Java application 140 that should access the native code 124. In addition, the data storage device 220 includes the Java native interface code generator 100, which preferably includes (i) a set of files, discussed below in conjunction with FIGS. 5 and 10, for mapping the native interface definition 142, generated by the programmer, to the appropriate Java and native language code required to implement the native capability in Java; (ii) a pair of Java Classes, JStruct and JUnion, discussed below in conjunction with FIGS. 6 and 8, respectively; and (iii) a code generator process 300, described in conjunction with FIG. 3, to actually implement the native capability in Java. Finally, in order to compile and execute the Java code and native code, the workstation 200 preferably includes the Java Developer's Kit 240 and a native code compiler 250. It is again noted that the native code compiler 250 must compile native code into DLLs.

Figure 3:
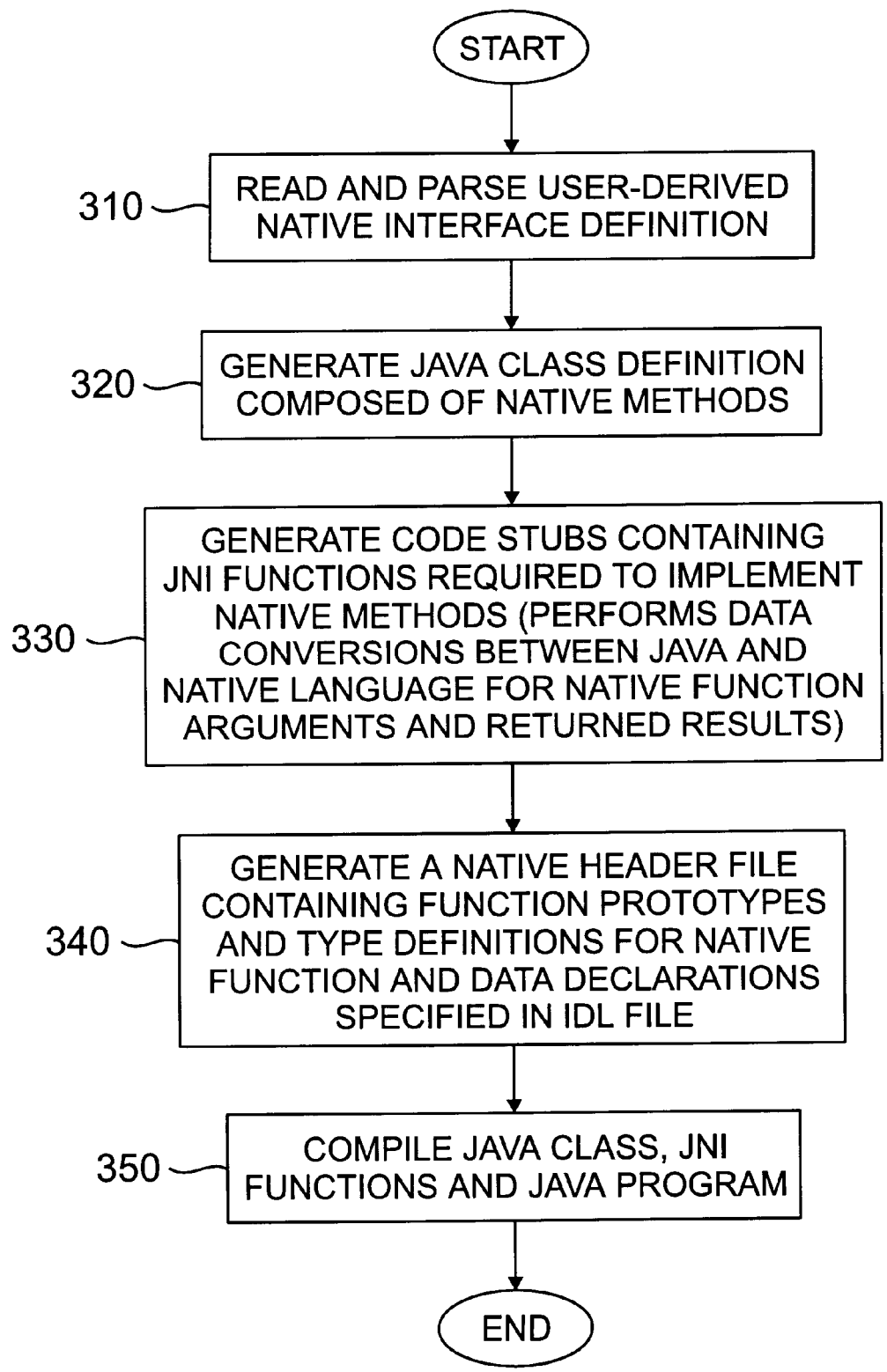
FIG. 3 is a flow chart describing an exemplary code generator process of FIG. 2.

FIG. 3 illustrates the code generator process 300, and is described in conjunction with an example shown in FIG. 4. Generally, the code generator process 300 reads and parses the user-derived native interface definition 142, in a known manner, and generates the appropriate Java and native language code required to implement the native capability in Java. In order to illustrates the principles of the present invention, the discussion of the operation of the user interface 300 is interleaved with an example where Java does not meet the needs of an application, and the Java native interface code generator 100 can be utilized to exploit an existing native function. Specifically, the Java language does not provide a math class for numerical computations using Bessel functions, as part of the Java core API. A number of C language development packages, however, do provide an implementation for Bessel functions. Thus, using the Java native interface code generator 100 the Bessel functions from a C language development package may be accessible in one or more Java applications 140. The function prototypes for the Bessel functions are obtained from the C language header file math.h that defines the native Bessel math functions, and are set forth in FIG. 4A.

As shown in FIG. 3, the user interface 300 initially reads and parses the user-derived native interface definition 142 during step 310 to generate mappings for everything in the parse tree. As previously indicated, the native interface definition 142 is preferably specified using a subset of the OMG Interface Definition Language. The native interface definition 142 is a description of the functions, data structures, constants and other user-defined data types, for which native mappings (bindings) are to be generated. The native interface definition 142 for the Bessel functions (bessel.idl) are set forth in FIG. 4B. It is noted that the IDL specification wraps the function declarations in an interface declaration construct, discussed below. The interface declaration provides a scope from which the operations can be accessed. Thus the IDL for each Bessel function consists of the type of the result returned from the Bessel function (can be any supported OMG IDL type), an identifier naming the native function for which a Native Method Implementation is to be generated (the identifier is scoped to the IDL interface declaration in which it is defined) and a parameter list that specifies zero or more parameter declarations for the operation (each parameter is used to describe an argument passed to the native function).

Since the Java native interface code generator 100 is a programming tool used to generate code for mixed language programming, multiple sets of mappings are required; namely, a first mapping for Java (.java file), a second mapping for the target native language (in native call of code stubs file) and still another mapping for the JNI code used to glue the Java and native code together. The specific mappings are discussed below in conjunction with FIGS. 5 and 9.

Thus, once the code generator process 300 has parsed the user-derived native interface definition 142 during step 310, the Java Class definition will be generated during step 320 using the IDL to Java mappings provided in FIGS. 5 and 10. In the illustrative example, the IDL file set forth in FIG. 4B (bessel.idl) will be mapped to the Java class (bessel.java) set forth in FIG. 4C. The public keyword in the Java class provides access control. The native keyword in the Java class indicates to the JDK 240 to look for the indicated native code in the DLL 120. The Java class file, bessel.java, contains the Java class definitions for the Bessel class. The Bessel class is composed of the native methods specified as part of the Bessel interface declaration in the native interface definition 142 (bessel.idl).

Thereafter, the data conversion code stubs 128 will be generated during step 330, using the IDL to JNI mappings provided in FIGS. 5 and 10. In the illustrative example, the IDL file set forth in FIG. 4B (bessel.idl) will be mapped to the data conversion code stubs 128 (bessel_stubs.c) set forth in FIG. 4D, for the j0 method of the Bessel class. The data conversion code stubs 128 contain the JNI functions required to implement the native methods of the Bessel class. In other words, the data conversion code stubs 128 performs data conversions between Java and the native code 124 for native function arguments and returned results.

The code generator process 300 optionally generates the required native header files (not shown), in a known manner, during step 340 which are required by the native compiler to compile the generated JNI code stubs source file 128. The header files contain the function prototypes and type definitions for native functions and data declarations specified in the native interface definition 142.

Finally, the generated Java classes, such as Bessel.class, as well as the Java application program 140 is compiled with the JDK 240, while the data conversion code stubs 128 (JNI functions), such as Bessel_stubs.c, are compiled into a Dynamic Linked Library (DLL) 120 during step 350. FIG. 4E illustrates a Java application 140 that invokes the Bessel native method. A further example will be discussed below in conjunction with FIGS. 10A through 10E and 11A through 11D, to illustrate native code utilizing complex data structures. In order to appreciate a more complex example, however, it is important to understand how the various module definitions, interface definitions, constant definitions or type definitions, which may comprise a native interface definition 142 are mapped by the Java native interface code generator 100 to generate the appropriate Java, JNI and native language code required to implement the native capability in Java

IDL SPECIFICATIONS

As previously indicated, the Interface Definition Language (IDL) is preferably embodied as the OMG Interface Definition Language Compiler Front End (CFE) Version 1.3, developed by Sun Microsystems, Inc. of Mountain View, Calif. The IDL defines a component's boundaries, or the component's interfaces with potential clients. The IDL specification for the Bessel functions (bessel.idl) was discussed above in conjunction with FIG. 4B. An IDL specification consists of one or more module definitions, interface definitions, constant definitions or type definitions, in a known manner.

Generally, the IDL module statement is a name scoping mechanism. In Java, the package statement is used as the primary name scoping mechanism. Thus, the IDL module statements are mapped by the Java native interface code generator 100 directly to Java package statements. The generated Java package has the same name as the IDL module. Any Java classes or Java interfaces generated for an IDL type within the IDL module, will be declared by the Java native interface code generator 100 inside the generated Java package. It is noted that an IDL module does not have a corresponding mapping in most native languages, such as C, and only indirectly affects the data conversion code stubs 128 (JNI code) generated by the Java native interface code generator 100, due to the Java native method naming conventions imposed by the JNI 130.

Generally, IDL interface declarations are used to define interfaces to object classes. The Java native interface code generator 100 preferably utilizes interface declarations to define native classes (object classes consisting solely of native methods). As shown, for example, in FIG. 4B, the identifier that names the interface is preceded by the keyword "interface" and defines a legal type name. The interface body includes constant declarations, type declarations and operation declarations, each discussed below. IDL interface declarations are mapped to Java classes (such as classes of native methods). The IDL interface declaration provides a scoping mechanism for specifying the native constant values, data types and operations that make up the native classes 135 generated by the Java native interface code generator 100. The Java class 135, data conversion code stubs 128 and related header files, if any, are generated to files with the same name as the IDL interface name, with a ".java," "_stubs.c," or "_impl.h" extension, respectively. The generated Java class 135 consists of "public static final" fields for any IDL constants specified as part of the interface declaration, and native methods for any IDL operations specified as part of the interface declaration.

The exact mapping of IDL constants in Java, however, vary depending on the IDL scope at which the constant values are declared. IDL constants declared at module scope are generated as a Java class, with the IDL constant name as the Java class name and a "public static final" field named "value" which is assigned to the constant value. IDL constants declared at interface scope are mapped as "public static final" fields of the Java class or interface that is generated for the IDL interface declaration of which it is a part. The field name has the name of the IDL constant. Finally, OMG IDL uses the typedef keyword to associate a name with a data type. The mappings for each data type are discussed in the next section.

DATA TYPE MAPPINGS

As previously indicated, the Java native interface code generator 100 is a programming tool used to generate code for mixed language programming. Thus, multiple sets of mappings are required; namely, a first mapping for Java (.java file), a second mapping for the target native language (in native call of code stubs file) and still another mapping for the JNI code used to glue the Java and native code together. Generally, when the sizes of data types differ between Java and the native language, the native language preferably rules. In other words, the IDL type size must match the native type size for any given data element. The Java native interface code generator 100 will generate the appropriate Java/JNI data type and/or provide appropriate conversions to a suitable data type, as discussed below.

Each section below describes an IDL construct and how it is mapped to Java, the native language, and where necessary, the JNI mapping. OMG IDL provides six integer data types: short, unsigned short, long, unsigned long, long long and unsigned long long for signed and unsigned varieties of 16-bit, 32-bit and 64-bit integers. FIG. 5A illustrates the mappings of each of the IDL integer data types. Since Java does not support unsigned data types, the Java native interface code generator 100 maps the IDL unsigned types to their correspondingly-sized Java integer types, thereby maintaining data type sizes between the mapped languages. Thus, the conversion between negative numbers and large unsigned types will be the responsibility of the native methods programmer.

OMG IDL provides three floating-point types: float, double and long double. FIG. 5B illustrates the IDL floating point data type mappings. The float and double types map directly to their corresponding Java and C language types. FIG. 5C provides the IDL mappings of other data types, namely, character, wide character, boolean, octet and any data types. As shown in FIG. 5C, the Java native interface code generator 100 preferably maps the char data type to a signed 8-bit quantity, which may be assigned a single-byte value from a byte-oriented code set, to thereby provide support for signed and unsigned 8-bit native data types. The boolean data type is utilized to denote a data item that can only take one of the IDL values, TRUE or FALSE. The IDL boolean type and its TRUE and FALSE values are mapped as shown in FIG. 5C.

FIGS. 5D and 5E illustrate the mapping of OMG IDL template types sequence and string, respectively. The OMG IDL sequence type is defined as a one-dimensional array with two characteristics: a maximum size (fixed at compile time) and a length (determined at run-time). A sequence declaration has two parameters. The first parameter specifies the type of data contained in the sequence, and the second optional parameter is a positive integer specifying the maximum size of the sequence. Sequences are mapped to, and used to represent, native pointer types, especially pointers that are used to point to variable-sized data. IDL sequences are mapped to Java arrays of the sequence type, as Java arrays can be resized by allocating a new array instance. Sequences used as operation arguments, map a second argument in the native function specifying the number of data elements in the sequence. Sequences that are part of a data structure also generate a second structure field in the native data structure which is used to specify the number of data elements pointed to by the pointer type representing the sequence.

The IDL type string is defined as a sequence of 8-bit characters. IDL string types may provide an optional argument that specifies the maximum size of the string. If a positive integer maximum size is specified, the string is termed a bounded string; if no maximum size is specified, the string is termed an unbounded string. The IDL string type is mapped as set forth in FIG. 5E.

Finally, OMG IDL defines multi-dimensional, fixed-size arrays. The array size for each dimension is fixed at compile time. All elements of the array are passed to IDL operation invocations (native method calls). As shown in FIG. 5F, IDL arrays are mapped to their corresponding Java and native array types.

CONSTRUCTED DATA TYPE MAPPINGS

In addition to the basic data types discussed above, many native languages support constructed or complex data types. A constructed data type is a unit of data that is composed of subordinate elements. Generally, there are three types of constructed data types, namely, enumerations, structures and unions. Each of these constructed data types requires special consideration, because they are not directly supported by Java.

i. Enumerations

An enumeration allows names to be assigned to specific values of declared variables. In this manner, the value name can be used in assignments and equality tests, instead of the explicit value. In addition, only those named values specified in the enumeration can be explicitly assigned to the variable, thereby preventing the variable from having any but the enumerated values. Thus, enumerations are suitable for variables having restricted or coded values.

Syntactically, an enumeration declaration is written in the following manner:

enum tag [{value list}] [initializers];

The tag of an enumeration distinguishes one enumeration from another. An enumeration tag may not duplicate the tag of any other enumeration, or of any structure or union. The value_list portion of an enumeration statement specifies the list of identifiers that instances of the enumeration may assume.

According to a feature of the present invention, an IDL enum type is mapped to a Java class that defines "public static final int" values for each enum member. The name of the class is preferably the name of the IDL enum type. A narrow ( ) method is also generated as part of the enumeration class to check that a Java int is in the range specified by the enum type. The narrow ( ) method preferably either returns the argument value or generates a "java.lang.RuntimeException". The argument value is returned so that the narrow ( ) method can be used inline in an expression.

For example, the following IDL specification declares a new enumeration type, named Color, which enumerates a palette of eight colors:

```
module examples {
  module jmudd {
    enum Color { white, red, orange, yellow, green, blue, violet, black };
  };
};
```

The Java native interface code generator 100 will preferably generate the following Java class definition in the file Color.java.

```
package examples.jmudd;
public class Color {
  public static final int white = (int) 0;
  public static final int red = (int) 1;
  public static final int orange = (int) 2;
  public static final int yellow = (int) 3;
  public static final int green = (int) 4;
  public static final int blue = (int) 5;
  public static final int violet = (int) 6;
  public static final int black = (int) 7;
  public static final int narrow(int i) throws
  java.lang.RuntimeException
  {
    if (i <0 || i> (int) 7)
      throw new java.lang.RuntimeException(
        "Cannot narrow to Color value: "+i);
    return i;
  }
}
``` ii. Structures

A structure is a collection of data elements arranged in a specific order. While the layout of the structure is called the "template," the term "structure" is reserved for a particular instance. Generally, an IDL struct is an aggregate data type consisting of elements of arbitrary data types. Name scoping rules require that the member declarators in a particular structure be unique. The identifier following the struct keyword defines a new legal type. Structure types may also be named using a typedef declaration. An IDL struct is mapped by the Java native interface code generator 100 to a Java class that provides public instance variables for the fields, a constructor taking the initial field values, and a no argument constructor (so the fields can be filled in later). The name of the generated class is the name of the IDL structure type.

According to a feature of the present invention, the Java class generated for the struct type extends another Java class, referred to herein as JStruct. Thus, the Java native interface code generator 100 provides a JStruct class, which is an abstract superclass for Java "data structures." As discussed hereinafter, the JStruct class implements Java Serializable and Cloneable interfaces and provides the core functionality for all data structures mapped to Java objects. In other words, the JStruct class specifies characteristics that apply to all Java data structures. Each Java data structure is said to "extend" the JStruct class and thereby inherits the behavior and characteristics of the JStruct class, including memory management features. In this manner, each Java data structure is sure to have proper memory management, including allocation, freeing and garbage collection.

In accordance with the present invention, the JStruct class preferably provides methods for converting between members of a native language data structure and fields of a Java object, as well as additional memory management functionality. In this manner, a Java data structure that extends the JStruct class will inherit these methods. In addition, as discussed below, each of the Java data structures (the subclasses of JStruct) must provide native methods to convert to/from the members of a native language data structure and fields of a Java object. In addition, each of the Java data structures must provide native methods to allocate and free memory for the native language data structure, since the Java memory space is separate from the native language memory, and the Java garbage collector cannot monitor the native language memory.

Portions of the JStruct class (JStruct.java) are shown in FIGS. 6A and 6B. The JStruct class may contain additional methods and characteristics, which are not illustrated. As shown in FIG. 6A, the JStruct class preferably contains two methods for converting data fields of the JStruct object to its corresponding native language data structure. A first method, toC, shown in section 610 of FIG. 6A, utilizes memory which was previously allocated for the native language data structure, or dynamically allocates a memory block of suitable size, via an allocateC( ) native method. A second method, toC, shown in section 620 of FIG. 6A, converts the data fields, given the destination native language data structure memory handle. The second method, toC, is primarily intended to convert data owned by another object. Both the first and second methods, toC, initiate a native method, convertToC( ), provided by the subclass Java data structure.

Likewise, the JStruct class preferably contains two methods for converting members of the native language data structure encapsulated by this object, to their equivalent data fields of the JStruct object. A first method, fromC, shown in section 630 of FIG. 6A, will release the associated native language data structure via the freeC( ) native method, once the native method data structure is converted to its Java language equivalent. A second method, fromC, shown in section 640 of FIG. 6B, converts members of the native language data structure encapsulated by this object, to their equivalent data field members of the JStruct object, given a handle to the native language data structure. The second method, fromC, is primarily intended to convert data owned by another object, such as another JStruct object which encapsulates the object for which this method is invoked (for example, a nested data structure). The second method, fromC, will release the associated native language data structure via the freeC( ) native method, once the native method data structure is converted to its Java language equivalent.

In addition, the JStruct class preferably contains a method, getHandle, shown in section 650 of FIG. 6B, to obtain a pointer or handle to the native language data structure memory associated with the JStruct object, and a method finalize, shown in section 660 of FIG. 6B, to be run by the Java garbage collector to free the dynamically allocated native language data structure memory block associated with the JStruct object. As shown in section 650, if a native language data structure memory block is not currently associated with the JStruct object when getHandle is initiated, a memory block will be allocated by the allocateC( ) native method, and its associated memory handle will be returned. The finalize method allows a Java virtual machine to release the encapsulated native memory block for the native language structure, when the Java garbage collector detects that there is no longer a reference to the JStruct object.

It is noted that when a native method is passed a JStruct subclass as an argument, the Java native interface code generator 100 will automatically allocate and free the native memory block for the native language structure as part of the generated data conversion code stubs 128. Thus, the native language structure only exists for the length of the execution of the corresponding data conversion code stubs 128. If the native language structure should need to exist for longer than that period, persistence of the data structure is required. A persistent data structure can be obtained by having the Java application program execute the toC method, and using the getHandle method to obtain a reference to the native language memory. The reference can then be passed as a parameter to the native method as a Java integer. As indicated above, the finalize method allows a Java virtual machine to release the encapsulated native memory block for the native language structure, when the Java garbage collector detects that there is no longer a reference to the JStruct object.

In a preferred embodiment, the JStruct class also incorporates methods for saving, restoring, cloning and converting the JStruct object to a string. The native methods that must be included in the subclasses of the JStruct class are set forth in section 670 of FIG. 6B.

An example of a Java data structure, Simple, that extends and modifies the JStruct class is shown in FIGS. 7A through 7G. A native interface definition 142 for the Simple data structure is shown in FIG. 7A. As discussed above, the Java native interface code generator 100 will read and parse the native interface definition 142 of the Simple data structure and generate the appropriate Java code (Simple.java) and data conversion code stubs 128 (Simple_stubs.c) to permit the Simple native language data structure to be accessed by Java. The Java class, Simple.java, for the Simple data structure is shown in FIGS. 7B and 7C. The Java class, Simple.java, contains the native methods that each subclass of the JStruct class is required to have, as shown in FIGS. 7B and 7C. The Java class contains a section 705 (FIG. 7B) which instantiates the members of the native language data structure, Simple, and initializes each field of the Java object. Section 715 of the Java class provides a constructor used to construct a Simple object, given a handle to its corresponding native language data structure type. Section 720 of the Java class provides the finalize native method to be executed by the Java garbage collector. Thereafter, section 725 defines the Java fields corresponding to the data structure members.

Section 730 (FIG. 7B) and 735 (FIG. 7C) indicate that the indicated native methods are implemented by the JNI, as required for each subclass of the JStruct class. Thus, the corresponding native language code for each native method will be provided in the data conversion code stubs 128 (Simple_stubs.c), discussed below in conjunction with FIGS. 7D through 7G. Section 740 of the Simple Java Class (FIG. 7C) provides a method for comparing two JStruct objects (subclasses) for equality. Finally, section 745 of the Simple Java Class loads an associated DLL for the data conversion code stubs 128 at run-time.

FIGS. 7D through 7G, collectively, provide the data conversion code stubs 128 for the Simple data structure. FIG. 7D contains the #include directives (indicating to replace the line with the contents of the file specified as the directive's operand), as well as the code 750 for the allocateC native method, which allocates the corresponding native language data structure. FIG. 7E contains the code 755 to implement the convertToC native method for the Simple data structure. The convertToC native method converts the Java object to its corresponding native language data structure. FIG. 7F contains the code 770 to implement the convertFromC native method for the Simple data structure. The convertFromC native method converts the encapsulated native language data structure to its corresponding Java object fields. FIG. 7G contains the code 785 to implement the freeC native method for the Simple data structure. The freeC native method frees the encapsulated native language data structure memory block and any of its dynamically allocated components.

iii. Unions

A union is essentially identical to a structure syntactically and operationally. While the members of a structure are allocated space consecutively, and the size of the structure is equal to the sum of the sizes of its members, the members of a union all overlap, and the size of a union is equal to the size of its largest member. Thus, members of a union are alternative descriptions of a memory area, where at any given time the union contains one and only one of its members. The member that properly describes the contents of the union is the member which most recently had a value stored in it. A union can store different types of values in the same memory area. At any give time, however, only one member of the union properly describes the contents of the union.

The union header specifies a typed tag field or discriminant field that is used to determine which union branch to use for the current instance or call. Name scoping rules require that the element declarators in a particular union be unique. The identifier following the union keyword defines a new legal type. Union types may also be named using a typedef declaration. An IDL union is mapped to a Java class that provides a no argument constructor, an accessor method for the discriminator, an accessor and modifier method for each of the union branches, and a static method to create an instance of the union type for each union branch. The name of the generated class is the name of the IDL union type.

According to a feature of the present invention, the Java class generated for the union type extends another Java class, referred to herein as JUnion. Thus, the Java native interface code generator 100 provides a JUnion class, which is an abstract superclass for Java "unions". As discussed hereinafter, the JUnion class implements Java Serializable and Cloneable interfaces and provides the core functionality for all unions mapped to Java objects. In other words, the JUnion class specifies characteristics that apply to all Java unions. Each Java union is said to "extend" the JUnion class and thereby inherits the behavior and characteristics of the JUnion class, including memory management features. In this manner, each Java union is sure to have proper memory management, including allocation, freeing and garbage collection.

In accordance with the present invention, the JUnion class preferably provides methods for converting between members of a native language union and fields of a Java object, as well as additional memory management functionality. In this manner, a Java union that extends the JUnion class will inherit these methods. In addition, as discussed below, each of the Java unions (the subclasses of JUnion) must provide native methods to convert to/from the members of a native language union and fields of a Java object. In addition, each of the Java unions must provide native methods to allocate and free memory for the native language union.

Portions of the JUnion class (JUnion.java) are shown in FIGS. 8A through 8C. The JUnion class may contain additional methods and characteristics, which are not illustrated. As shown in FIG. 8A, the JUnion class preferably provides two methods, JUnion, shown in sections 810 and 820 to construct a JUnion object, with or without a handle to its native language union type, respectively. The JUnion class preferably provides a method finalize, shown in section 830 of FIG. 8A, to be run by the Java garbage collector to free the dynamically allocated native language union memory block associated with the JUnion object. The finalize method allows a Java virtual machine to release the encapsulated native memory block for the native language union, when the Java garbage collector detects that there is no longer a reference to the JUnion object.

As shown in FIG. 8B, the JUnion class preferably contains a method, getHandle, shown in section 840 of FIG. 8B, to obtain a pointer or handle to the native language union memory associated with the JUnion object. If a native language union memory block is not currently associated with the JUnion object when getHandle is initiated, a memory block will be allocated by the allocateC( ) native method, and its associated memory handle will be returned.

In addition, the JUnion class preferably contains two methods for converting data fields of the JUnion object to its corresponding native language union. A first method, toC, shown in section 860 of FIG. 8B, utilizes memory which was previously allocated for the native language union, or dynamically allocates a memory block of suitable size, via an allocateC( ) native method. A second method, toC, shown in section 870 of FIG. 8B, converts the data fields, given the destination native language union memory handle. The second method, toC, is primarily intended to convert data owned by another object. Both the first and second methods, toC, initiate a native method, convertToC( ), provided by the subclass Java data structure.

Likewise, the JUnion class preferably contains two methods for converting members of the native language union encapsulated by this object, to their equivalent data fields of the JUnion object. A first method, fromC, shown in section 880 of FIG. 8B, will release the associated native language union via the freeC( ) native method, once the native method union is converted to its Java language equivalent. A second method, fromC, shown in section 885 of FIG. 8C, converts members of the native language union encapsulated by this object, to their equivalent data field members of the JUnion object, given a handle to the native language union. The second method, fromC, is primarily intended to convert data owned by another object, such as a JStruct object which encapsulates the object for which this method is invoked (for example, a union type nested within a data structure). The second method, fromC, will release the associated native language union via the freeC( ) native method, once the native method union is converted to its Java language equivalent.

In a preferred embodiment, the JUnion class also incorporates methods for saving, restoring, cloning and converting the JUnion object to a string. The native methods that must be included in the subclasses of the JUnion class are set forth in section 890 of FIG. 8C.

OPERATION ARGUMENT/RESULT MAPPINGS

The native functions for which a native method implementation is to be generated by the Java native interface code generator 100 are described by IDL operation declarations. An operation declaration consists of (i) the type of the result returned from the native function (return type can be any valid OMG IDL type supported by the Java native interface code generator 100, or void if the operation does not return a value); (ii) an identifier naming the native function for which a native method implementation is to be generated (which is scoped to the IDL interface declaration in which it is defined); and (iii) a parameter list that specifies zero or more parameter declarations for the operation (each parameter describes an argument passed to the native function).

IDL operation return types should be specified by the programmer using the mapping form IDL to the native language. According to a feature of the invention, the Java native interface code generator 100 will automatically generate the appropriate mapping from IDL to Java for the return type and generate the appropriate JNI code required to convert the return value from the native language to Java. IDL operations are mapped to "public native" method declarations in the Java class associated with the IDL interface in which they are defined. The scope of the generated native method declaration is preferably public, by default. For each IDL operation, the Java native interface code generator 100 also generates a data conversion code stubs 128 (JNI routine) to call the native method and to marshal the operation data and returned result between Java and the native language for which the native method implementation is being generated. The JNI code stub 128 provides the implementation of the native method declared in the generated Java class, and must be compiled and placed in the DLL 120.

IDL parameter declarations are used by the Java native interface code generator 100 to describe the arguments passed to the native functions for which a native method implementation is to be generated. A parameter declaration must have a directional attribute that specifies the direction in which the argument is being passed. The directional attributes are (i) in (argument value is passed from the caller to the callee and is not modified by callee); (ii) out (the caller supplies a reference to the location where the callee is to store the argument value, which is not valid until the operation returns); and (iii) inout (where the caller supplies the initial value, which is passed by reference to the callee, modified or used by the callee and then passed back to the caller when the operation returns). IDL types as parameters should be specified using the mappings from IDL to the native language, shown in FIGS. 9A through 9D. The Java native interface code generator 100 will automatically generate the appropriate mappings from IDL to Java and generate the appropriate data conversion code stubs 128 (JNI code) required to convert the parameter between Java and the native language as appropriate for the specified parameter direction attribute. It is noted that the constructs in the Java mappings, such as StringRef, ObjectRef, TypeArrayRef, and JstructArrayRef, are wrapper classes that implement pass-by-reference functionality for parameters modified within data conversion code stubs 128.

ILLUSTRATIVE EXAMPLE

FIG. 10A shows a native interface definition 142 for a native class of methods, JmuddStructTest, that utilizes a number of complex data types, including the Simple data structure discussed above in conjunction with FIG. 7. The native interface definitions 142 for the other complex data types, Simple, Nested and ThreeDeep, utilized by the native class, JmuddStructTest, are also set forth in FIG. 10A.

The Java class generated by the Java native interface code generator 100 for the native interface definition 142, shown in FIG. 10A, of the JmuddStructTest class is set forth in FIG. 10B. The Java class for the Simple data structure was discussed above in conjunction with FIGS. 7B and 7C. The Java class 135 generated for the complex data type, Nested, is shown in FIGS. 11A and 11B. The Java class 135 generated for the complex data type, ThreeDeep, is generated in a similar manner to the Java class generated for the Simple and Nested data structures, shown in FIGS. 7B and 7C and FIGS. 11A and 11B, respectively.

The data conversion code stubs 128 for the native class, JmuddStructTest, are set forth in FIGS. 10C through 10E. The data conversion code stubs 128 for the Simple data structure was discussed above in conjunction with FIGS. 7D through 7G. The data conversion code stubs 128 for the for the complex data type, Nested, is shown in FIGS. 11C and 11D. The data conversion code stubs 128 for the for the complex data type, ThreeDeep, is generated in a similar manner to the data conversion code stubs 128 generated for the Simple and Nested data structures, shown in FIGS. 7D through 7G and 11C and 11D, respectively. It is noted that the data conversion code stubs 128 presented, for example, in FIGS. 10C through 10E, include statements in the form "Jg__", which preferably invoke routines from a library to reduce the amount of code which must be generated by the Java native interface code generator, as would be apparent to a person of ordinary skill familiar with JNI routines.

It is to be understood that the embodiments and variations shown and described herein are merely illustrative of the principles of this invention and that various modifications may be implemented by those skilled in the art without departing from the scope and spirit of the invention. In addition, it is to be understood that the source code provided herein is meant to illustrate the principles of the present invention, and is not intended to compile correctly.

I claim:

1. A mixed language programming method for making a function or procedure written in a native language accessible to a Java application, said method comprising the steps of:
   receiving a native interface description that describes said function or procedure;
   parsing said native interface description; and
   processing said parsed native interface description to generate data conversion code stubs containing Java Native Interface functions required to implement said function or procedure and a Java class definition for said function or procedure, wherein said function or procedure, said data conversion code stubs and said Java class communicate directly by means of the Java Native Interface.

2. The method according to claim 1, wherein said native interface description is written in accordance with the OMG IDL.

3. The method according to claim 1, wherein said data conversion code stubs are compiled into a DLL.

4. The method according to claim 1, wherein said function or procedure is compiled into a DLL.

5. A mixed language programming method of making a data structure written in a native language accessible to a Java application, said method comprising the steps of:
   defining a data structure Java class specifying functionality and characteristics that apply to Java data structures;
   receiving a native interface description that describes said native data structure;
   parsing said native interface description; and
   processing said parsed native interface description to generate a Java class for said native data structure that extends said data structure Java class, said Java class for said native data structure inheriting said functionality and characteristics of said data stricture Java class.

6. The method according to claim 5, wherein said data structure Java class provides a function or procedure for converting between members of said language data structure and fields of a Java object.

7. The method according to claim 6, wherein said function or procedure for converting fields of a Java object to members of said language data structure automatically allocates memory for said native data structure.

8. The method according to claim 6, wherein said function or procedure for converting from members of said language data structure to fields of a Java object automatically frees memory allocated for said native data structure.

9. The method according to claim 5, wherein said data structure Java class provides one or more functions or procedures for memory management functionality.

10. The method according to claim 5, wherein said data structure Java class provides a function or procedure that release the native language data structure memory block corresponding to Java memory if a garbage collector detects references to unused objects.

11. A mixed language programming method of making a union written in a native language accessible to a Java application, said method comprising the steps of:

defining a union Java class specifying functionality and characteristics that apply to Java unions;

receiving a native interface description that describes said native union;

parsing said native interface description; and processing said parsed native interface description to generate a Java class for said native union that extends said union Java class, said Java class for said native union inheriting said functionality and characteristics of said data structure Java class.

12. The method according to claim 11, wherein said union Java class provides a function or procedure for converting between members of said language union and fields of a Java object.

13. The method according to claim 12, wherein said function or procedure for converting fields of a Java object to members of said language union automatically allocates memory for said native union.

14. The method according to claim 12, wherein said function or procedure for converting from members of said language union to fields of a Java object automatically frees memory allocated for said native union.

15. The method according to claim 11, wherein said union Java class provides one or more functions or procedures for memory management functionality.

16. The method according to claim 11, wherein said union Java class provides a function or procedure that release the native language union memory block corresponding to Java memory if a garbage collector detects references to unused objects.

17. A mixed language programming method for making a function or procedure written in a native language accessible to a Java application, said function or procedure having native code components, said method comprising the steps of:

generating a description of said native code components using a neutral description language;

parsing said native interface description; and processing said parsed native interface description to automatically generate data conversion code stubs containing Java Native Interface functions required to implement said function or procedure and a Java class definition for said function or procedure and any complex data types utilized by said method, wherein said function or procedure, said data conversion code stubs and said Java class communicate directly by means of the Java Native Interface.

18. The method according to claim 17, wherein said processing step produces consistent data conversion code stubs and Java classes.

19. The method according to claim 17, wherein said processing step produces reliable data conversion code stubs and Java classes.

20. The method according to claim 17, wherein said processing step produces maintainable data conversion code stubs and Java classes.

* * * * *